(12) United States Patent
Mallaiah et al.

(10) Patent No.: US 9,348,538 B2
(45) Date of Patent: May 24, 2016

(54) SELECTIVE DEDUPLICATION

(71) Applicant: NetApp, Inc., Sunnyvale, CA (US)

(72) Inventors: Damarugendra Mallaiah, Bangalore (IN); Jayanta Basak, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 150 days.

(21) Appl. No.: 13/655,263

(22) Filed: Oct. 18, 2012

(65) Prior Publication Data
US 2014/0114932 A1 Apr. 24, 2014

(51) Int. Cl.
*G06F 17/30* (2006.01)
*G06F 3/06* (2006.01)

(52) U.S. Cl.
CPC ............ *G06F 3/067* (2013.01); *G06F 3/0608* (2013.01); *G06F 3/0641* (2013.01); *G06F 17/30156* (2013.01)

(58) Field of Classification Search
None
See application file for complete search history.

(56) References Cited

U.S. PATENT DOCUMENTS

| 6,889,297 | B2 | 5/2005 | Krapp et al. | |
|---|---|---|---|---|
| 7,076,622 | B2 | 7/2006 | Hsu et al. | |
| 7,921,077 | B2 | 4/2011 | Ting et al. | |
| 7,996,371 | B1 | 8/2011 | Deshmukh | |
| 8,086,799 | B2 | 12/2011 | Mondal et al. | |
| 8,099,571 | B1 | 1/2012 | Driscoll et al. | |
| 8,527,544 | B1 * | 9/2013 | Colgrove et al. | 707/791 |
| 8,572,163 | B1 * | 10/2013 | Bromley et al. | 709/203 |
| 8,650,163 | B1 * | 2/2014 | Harnik et al. | 707/692 |
| 2009/0234795 | A1 | 9/2009 | Haas et al. | |
| 2009/0271402 | A1 | 10/2009 | Srinivasan et al. | |
| 2010/0088296 | A1 | 4/2010 | Periyagaram et al. | |
| 2010/0125553 | A1 * | 5/2010 | Huang et al. | 707/661 |
| 2010/0250501 | A1 * | 9/2010 | Mandagere et al. | 707/692 |
| 2010/0332401 | A1 * | 12/2010 | Prahlad et al. | 705/80 |
| 2011/0029497 | A1 * | 2/2011 | Benhase et al. | 707/698 |
| 2011/0231362 | A1 | 9/2011 | Attarde et al. | |
| 2011/0320865 | A1 | 12/2011 | Jain et al. | |
| 2012/0233135 | A1 | 9/2012 | Tofano | |

OTHER PUBLICATIONS

International Search Report and Writtent Opinion for Application No. PCT/US2013/065699; Applicant: NetApp, Inc.; Date of mailing: Feb. 17, 2014 (10 pages).
International Preliminary Report on Patentability for Application No. PCT/US2013/065699 mailed on Apr. 21, 2015, 6 pages.

* cited by examiner

*Primary Examiner* — Bai D. Vu
(74) *Attorney, Agent, or Firm* — Matthew A. Pequignot; Pequignot + Myers LLC

(57) ABSTRACT

Methods and apparatuses for performing selective deduplication in a storage system are introduced here. Techniques are provided for determining a probability of deduplication for a data object based on a characteristic of the data object and performing a deduplication operation on the data object in the storage system prior to the data object being stored in persistent storage of the storage system if the probability of deduplication for the data object has a specified relationship to a specified threshold.

27 Claims, 6 Drawing Sheets

SELECTIVE DEDUPLICATION

TECHNICAL FIELD

Various embodiments of the present application generally relate to the field of managing data storage systems. More specifically, various embodiments of the present application relate to methods and systems for selectively deduplicating data objects in a data storage system.

BACKGROUND

The global proliferation of computers and computing systems and applications for such systems has resulted in a continually growing need for efficient and reliable storage of data. Storage servers are often used to manage data storage activities. A storage server is a specialized computer that provides storage services related to the organization and storage of data, to one or more clients. A storage server is configured to operate according to a client/server model of information delivery and may enable many clients or applications to access the data served by the system. A storage server can employ a storage architecture that serves the data with both random and streaming access patterns at either a file level, as in network attached storage (NAS) environments, or at the block level, as in a storage area network (SAN). Data is typically stored on writable persistent storage media, such as non-volatile memories and disks.

In order to more efficiently use the available data storage space in a storage system and/or minimize the costs associated with storing data, various techniques are used to compress data or otherwise reduce the amount of physical storage space required by the system to store the data. In some cases, a storage system may contain many duplicate instances of the same data. For example, a large presentation file containing multimedia content may be distributed to many employees of a company. Even though each instance of this file is the same, many copies of it may end up being stored in the company's data storage system.

Data deduplication is one method of removing duplicate instances of data from a storage system. Data deduplication is a technique for eliminating coarse-grained redundant data. In a deduplication process, blocks of data are compared to other blocks of data stored in the system. When two or more identical blocks of data are identified, the redundant block(s) are deleted or otherwise released from the system. As used herein, a "block" of data is a contiguous set of data of a known length starting at a particular address value. In certain embodiments, each block is 4 kBytes in length. However, in a given implementation blocks could be another size or sizes.

When a data block is deduplicated, the block is effectively removed from the data storage system because a duplicate instance of the data block already exists in the data storage system. Metadata that was previously associated with the deleted block(s) is modified to point to the one instance of the data block that was not deleted. In this way, multiple files or applications can share the same block of data. The deduplication process saves storage space and resources by coalescing the duplicate data blocks and coordinating the sharing of single instances of common data blocks.

Deduplication is often performed on data in a storage system after the data has already been stored in a persistent storage device or facility in the data storage system. This approach is sometimes referred to as post-processing deduplication. Post-processing deduplication is beneficial in that it can be performed during periods of time in which the demands placed on the data storage system are lower, thereby reducing any effect on the read/write performance of the data storage system. In some cases, post-processing deduplication may be performed when the data storage system is otherwise offline (i.e., not available to its clients). The drawback to this approach is that the storage space savings benefit associated with the deduplication is not realized until some point in time after the data has been initially stored. Consequently, the system still needs sufficient available physical storage capacity to store the non-deduplicated data prior to the deduplication.

In other cases, deduplication is performed as the data is received by the data storage system and prior to it being stored in persistent storage of the data storage system. This approach is sometimes referred to as inline deduplication. While inline deduplication eliminates the need for additional physical data storage space that is needed when conducting post-processing deduplication, it can place significant demands on the data storage system because the complex computational processes involved in deduplication are performed as the data storage system is receiving read and write requests from clients. The computational demands of deduplicating every data object before it is stored in persistent storage can have an impact on the read/write performance of the data storage system because the deduplication operations are performed in real time, or near real time. This can be particularly challenging during the busiest times of operation. When the data storage system is processing an increased number of write requests, fewer computational resources are available to perform the increased number of deduplication operations associated with those write requests. As a result, a data storage system performing inline deduplication may have difficulty satisfying performance metrics.

In addition, inline deduplication typically requires less storage input/output (i.e., disk I/O) than post-processing deduplication. In post-processing deduplication, data objects are first written to persistent storage in non-deduplicated form. Consequently, the post-processing deduplication processing involves the additional I/O operations associated with reading the data objects, and then re-writing the resulting data objects after deduplication has been performed.

SUMMARY

Methods and apparatuses for performing selective deduplication in a storage system are introduced here. Techniques are provided for determining a probability of deduplication for a data object based on a characteristic of the data object and performing a deduplication operation on the data object in the storage system prior to the data object being stored in persistent storage of the storage system in response to the probability of deduplication for the data object having a specified relationship to a specified threshold. The techniques introduced here make more efficient use of available data storage system resources for inline deduplication than systems that exclusively perform either inline deduplication or post-processing deduplication. System resources are used more efficiently because inline deduplication is not performed on every data object and the benefit associated with the system resources that are used is increased by focusing the use of those resources on the data objects having a higher probability of providing a deduplication benefit.

In one embodiment, a data storage system includes persistent storage, a processor, and a memory coupled with the processor. The memory includes a storage manager that directs the processor to determine a deduplication probability threshold based on a performance metric of the data storage system. The storage manager also directs to the processor to determine, prior to a data object being stored in the persistent storage, a probability of deduplication for the data object based on a factor associated with the data object. The processor performs a deduplication operation on the data object prior to the data object being stored in the persistent storage if the probability of deduplication for the data object exceeds the deduplication probability threshold and stores the data object in the persistent storage.

Embodiments introduced here also include other methods, systems with various components, and non-transitory machine-readable storage media storing instructions which, when executed by one or more processors, direct the one or more processors to perform the methods, variations of the methods, or other operations described herein. While multiple embodiments are disclosed, still other embodiments will become apparent to those skilled in the art from the following detailed description, which shows and describes illustrative embodiments of the techniques introduced here. As will be realized, the techniques are capable of modifications in various aspects, all without departing from the scope of the present techniques. Accordingly, the drawings and detailed description are to be regarded as illustrative in nature and not restrictive.

BRIEF DESCRIPTION OF THE DRAWINGS

Embodiments of the presently disclosed technique will be described and explained through the use of the accompanying drawings in which.

Figure 1:
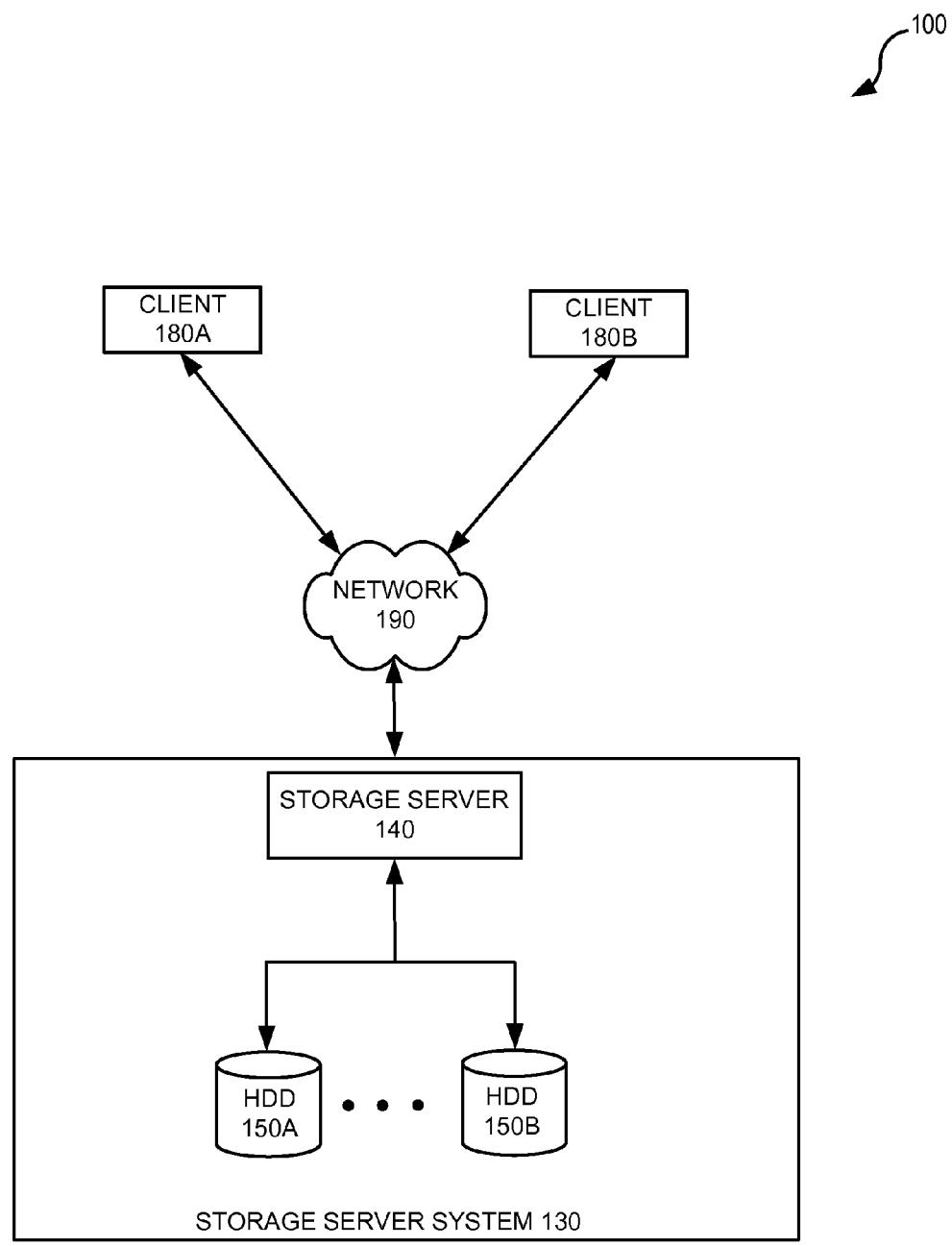
FIG. 1 illustrates an operating environment in which at least some embodiments of the disclosed technique may be utilized.

The drawings have not necessarily been drawn to scale. For example, the dimensions of some of the elements in the figures may be expanded or reduced to help improve the understanding of the embodiments of the technique introduced here. Similarly, some components and/or operations may be separated into different blocks or combined into a single block for the purposes of discussion of some of the embodiments of the technique introduced here. Moreover, while the technique is amenable to various modifications and alternative forms, specific embodiments are shown by way of example in the drawings and are described in detail below. The intention, however, is not to limit the technique to the particular embodiments described. On the contrary, the technique is intended to cover all modifications, equivalents, and alternatives falling within the scope of the technique as defined by the appended claims.

DETAILED DESCRIPTION

Data deduplication removes duplicate instances of data in a data storage system. From the standpoint of computing resource availability, it is generally less challenging to perform deduplication in post-processing after data objects have already been stored to persistent storage, because the deduplication can be performed during time periods in which there is less demand on the storage system and/or the post-processing deduplication tasks can be offloaded to other processing devices. However, post-processing deduplication requires that the data storage system have sufficient persistent storage space available to initially store data objects in non-deduplicated form prior to the post-processing deduplication.

Inline deduplication resolves the drawbacks of post-processing deduplication discussed above by performing the deduplication in real time, or near real time, before the incoming data objects (i.e., data objects received by the system from clients or other systems and to be written) are stored in the persistent storage. The received data objects are stored in system memory, or another temporary storage location, and deduplicated before they are stored in the persistent memory of the storage system. Although this approach reduces the amount of persistent storage needed to store the data object, it increases the computational demands on the data storage system. Consequently, inline deduplication requires the data storage system to have increased computational capability and/or diminishes performance of the system at times when the system is servicing many requests. In some cases, data storage systems which have inline deduplication capability are unable to utilize this capability because doing so may cause the system to be unable to meet performance metrics or service level objectives (SLOs).

The solution introduced here addresses the problems discussed above, by selectively performing inline deduplication on only certain data objects being written to a data storage system but not on others. Performing selective deduplication in one embodiment includes performing deduplication on only those data objects that are determined to have a sufficiently high probability of having a deduplication benefit. As used herein, the term "deduplication benefit" is used to describe a data object whose physical size in the data storage system can be reduced by performing deduplication on the data object. Whether or not a particular data object has or will have a deduplication benefit is dependent on the data storage system in which the data object is stored, because the benefit is dependent on whether or not the data storage system already contains one or more data blocks that are duplicates of data blocks in the data object.

In the disclosed solution, the probability that a particular data object will benefit from deduplication is determined based on a characteristic of the data object. In one embodiment, the probability of deduplication for a particular data object is determined to be sufficient to justify inline deduplication if it exceeds a specified deduplication probability threshold for the data storage system. The threshold for the system can be set and/or adjusted based on performance of the data storage system and system resource availability. In this way, the limited data storage computing resources available to perform deduplication inline are used for only those data objects that have one or more characteristics that suggest there will be a deduplication benefit associated with the data object. As discussed below, various characteristics may be used to determine the deduplication probability for a data object.

Deduplication probabilities for data objects can be based on aggregated statistical information indicating whether or not data objects having various characteristics have provided deduplication benefits in the past. However, the deduplication probability is only a statistical projection and is not necessarily indicative of whether any individual data object will actually provide a deduplication benefit. Therefore, an individual data object may or may not provide a deduplication benefit regardless of its deduplication probability and regardless of whether it is deduplicated inline or deduplicated in post-processing. However, when applied in this manner over a relatively large quantity of data objects, use of the deduplication probabilities will provide an overall deduplication benefit.

The techniques introduced here make more efficient use of available data storage system resources for inline deduplication than systems that exclusively perform either inline deduplication or post-processing deduplication. System resources are used more efficiently because inline deduplication is not performed on every data object and the benefit associated with the system resources that are used is increased by focusing the use of those resources on the data objects having a higher probability of providing a deduplication benefit. Compared to post-processing deduplication, the amount of persistent storage space needed is reduced because some of the data objects are deduplicated prior to being stored in the persistent storage thereby taking advantage of data sharing relationships with data blocks which are already stored in the data storage system. In other words, the physical sizes of the deduplicated data objects are reduced before they are stored in persistent storage.

Post-processing deduplication may be performed on those data objects that were not selectively deduplicated inline after the data objects have been stored in the persistent storage. This post-processing deduplication may yield additional storage space savings. Any storage space savings associated with this post-processing is expected to be smaller, on a per data object basis, than the storage space savings associated with the inline deduplication, because the deduplication probabilities of the post-processed data objects are lower than the inline deduplicated data objects. However, the post-processing deduplication may be performed during a time period when demands on the system are lower and/or performed in a background operation to reduce any effects on system performance.

FIG. 1 illustrates an operating environment 100 in which some embodiments of the techniques introduced here may be utilized. Operating environment 100 includes storage server system 130, clients 180A, client 180B, and network 190.

Storage server system 130 includes storage server 140, HDD 150A, and HDD 150B. Storage server system 130 may also include other devices or storage components of different types which are used to manage, contain, or provide access to data or data storage resources. Storage server 140 is a computing device that includes a storage operating system that implements one or more file systems. Storage server 140 may be a server-class computer that provides storage services relating to the organization of information on writable, persistent storage media such as HDD 150A and HDD 150B. HDD 150A and HDD 150B are hard disk drives. Storage server system 130 may also include other types of storage devices or memory including solid state drives (SSDs), tape drives, optical drives, and flash memory. A typical storage server system will include many more HDDs or other storage devices than are illustrated in FIG. 1. Storage server system 130 is illustrated as a monolithic system, but could include systems or devices which are distributed among various geographic locations. Storage server system 130 may also include additional storage servers which operate using storage operating systems which are the same or different from storage server 140.

Storage server 140 provides data storage services for clients such as client 180A and client 180B. In order to make more efficient use of the storage space available in HDD 150A and HDD 150B, storage server 140 may perform deduplication on data stored on HDD 150A and HDD 150B in a variety of ways. The techniques introduced herein are used to perform selective inline deduplication on the data. The techniques and the teachings of this description can be adapted to a variety of storage server architectures including, but not limited to, a network-attached storage (NAS), storage area network (SAN), a disk assembly directly-attached to a client or host computer, an individual disk with a disk controller, or to another type of storage device. The term "storage server" should therefore be taken broadly to include such arrangements. Elements of the storage architecture may communicate using Hypertext Transfer Protocol (http) or another protocol.

Figure 2:
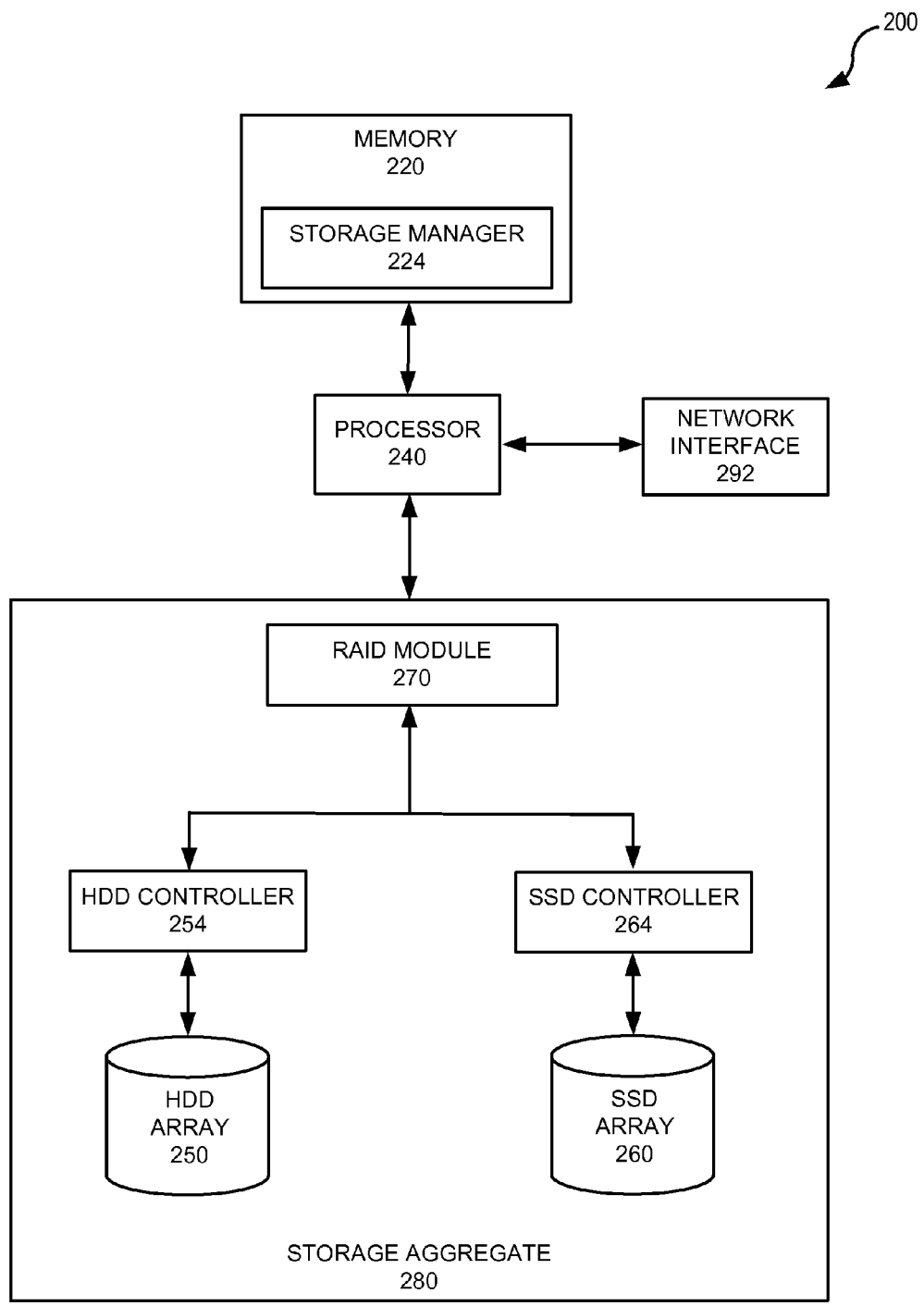
FIG. 2 illustrates a storage system in which at least some embodiments of the disclosed technique may be utilized.

FIG. 2 illustrates storage system 200 in which some embodiments of the techniques introduced here may also be utilized. Storage system 200 includes memory 220, processor 240, network interface 292, and storage aggregate 280. Storage aggregate 280 includes HDD array 250, HDD controller 254, SSD array 260, SSD controller 264, and redundant array of independent disks (RAID) module 270. HDD array 250 and SSD array 260 are heterogeneous tiers of persistent storage media. The embodiments described herein are not limited to the HDD/SSD configuration illustrated and are not limited to implementations which have only two types of storage media.

HDD array 250 and/or SSD array 260 may each be a collection of RAID groups which may include one or more volumes. RAID module 270 organizes the HDDs and SSDs within a particular volume as one or more parity groups (e.g., RAID groups) and manages placement of data on the HDDs and SSDs. RAID module 270 further configures RAID groups according to one or more RAID implementations to provide protection in the event of failure of one or more of the HDDs or SSDs. The RAID implementation enhances the reliability and integrity of data storage through the writing of data "stripes" across a given number of HDDs and/or SSDs in a RAID group including redundant information (e.g., parity). HDD controller 254 and SSD controller 264 perform low level management of the data which is distributed across multiple physical devices in their respective arrays. RAID module 270 uses HDD controller 254 and SSD controller 264 to respond to requests for access to data in HDD array 250 and SSD array 260.

Memory 220 includes storage locations that are addressable by processor 240 for storing software programs and data structures to carry out the techniques described herein. Processor 240 includes circuitry configured to execute the software programs and manipulate the data structures. Storage manager 224 is one example of this type of software program. Storage manager 224 directs processor 240 to, among other things, implement one or more file systems. Processor 240 is also interconnected to network interface 292. Network interface 292 enables other devices or systems to access data in storage aggregate 280. In one embodiment, processor 240 performs one or more of the techniques and methods described herein on data stored in one or more of HDD array 250 and SSD array 260.

Figure 3:
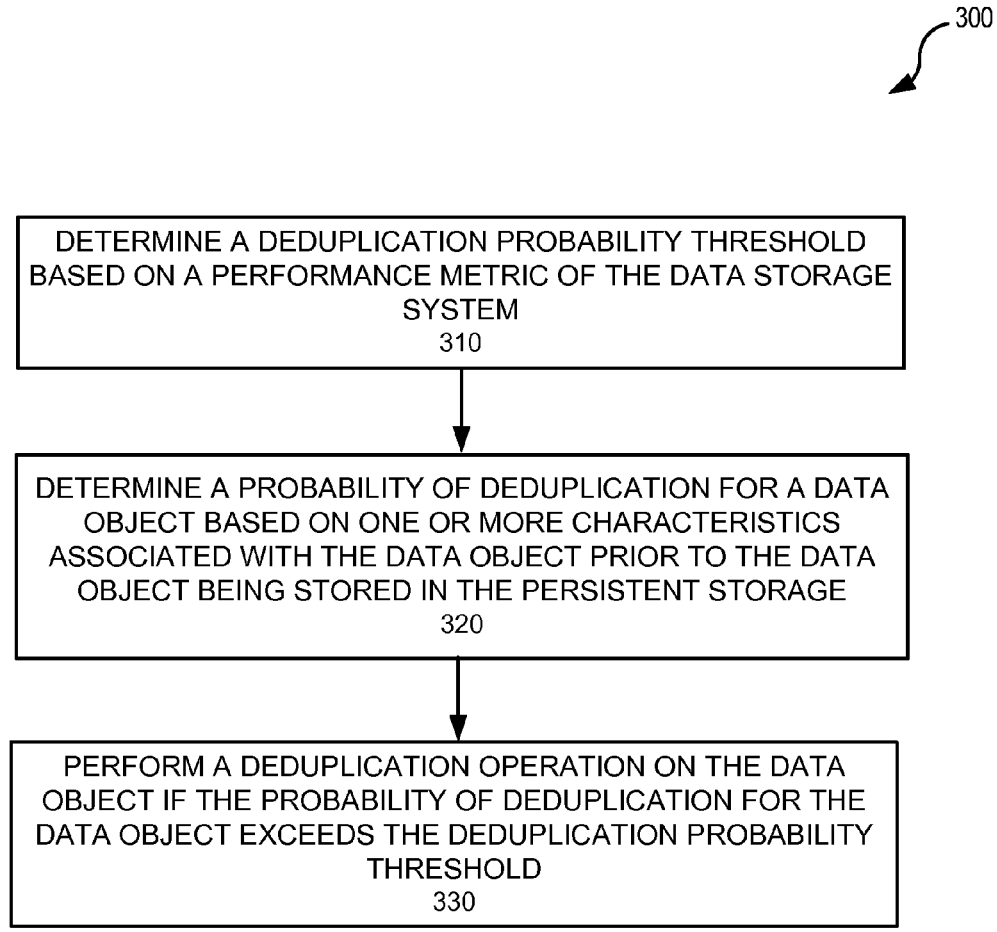
FIG. 3 illustrates an example of a method of performing selective deduplication.

FIG. 3 illustrates method 300 that may be performed by processor 240, storage server 140, or another processing device in one embodiment of the disclosed solution. In one embodiment the method 300 can be implemented in a storage server such as storage server 140 in FIG. 1. Note, however, that the technique introduced here can be implemented in any processing system that performs data deduplication and does not have to be implemented in a storage server.

At step 310, a deduplication probability threshold is determined based on a performance metric of a storage system. In some cases, the performance metric may include or be a function of an SLO. In one embodiment, the performance metric is a read and/or a write response time of the data storage system. In another embodiment, the performance metric is, or is a function of, a read and/or a write throughput rate of the data storage system. Computational resources of the data storage system are preferably only be used to perform inline deduplication to the extent that the performance metrics or other expectations of the data storage system will still be met. In some cases, the deduplication probability may also be determined, in whole or in part, by a system administrator.

The deduplication probability threshold is used to determine how inline deduplication will be applied to the incoming data objects. More specifically, it is used to determine the incoming data objects on which inline deduplication will be performed. Use of the deduplication probability threshold results in inline deduplication being performed only on certain data objects, i.e., those data objects that are more likely than others to provide a deduplication benefit. In one example, a determination may be made to set the deduplication probability threshold to 50%. Inline deduplication operations will only be performed on those data objects found to have probabilities of deduplication of at least 50%.

At step 320, a probability of deduplication is determined for a data object written to the data storage system. The probability of deduplication is determined before the data object is stored in persistent storage of the data system and is determined based on one or more characteristics of the data object. The one or more characteristics of the data object that are used to determine the probability of deduplication for the data object can include characteristics such as the size of the data object (e.g., number of bytes), the type of the data object (e.g., a spreadsheet), the owner of the data object, the last modified date/time of the data object, or the update frequency of the data object.

In one example, statistical information derived from one or more previous deduplication operations may indicate that data objects smaller than 200 KB have a 15% probability of having a deduplication benefit, data objects having a size from 200 KB to 800 KB have a 30% probability of having a deduplication benefit, data objects having a size from 800 KB to 2 MB have a 55% probability of having a deduplication benefit, and data objects larger than 2 MB have a 65% probability of having a deduplication benefit. The statistics may be broken down into fewer or more data object size categories. In this example, the deduplication probability for a 1.7 MB incoming data object would be 55% based on the statistical data. The statistical data is based on whether or not data objects in this size range provided a deduplication benefit in previous deduplication operations. The probability of deduplication of a data object may also be determined as a function of one or more other characteristics of the data object, and can be a function of multiple characteristics simultaneously.

At step 330, an inline deduplication operation is performed on the data object if the data object's probability of deduplication exceeds the deduplication probability threshold. Continuing with the example above, inline deduplication will be performed on the 1.7 MB data object because it was determined to have a deduplication probability, 55%, that is greater than the current deduplication probability threshold for the system, 50%.

Figure 4A:
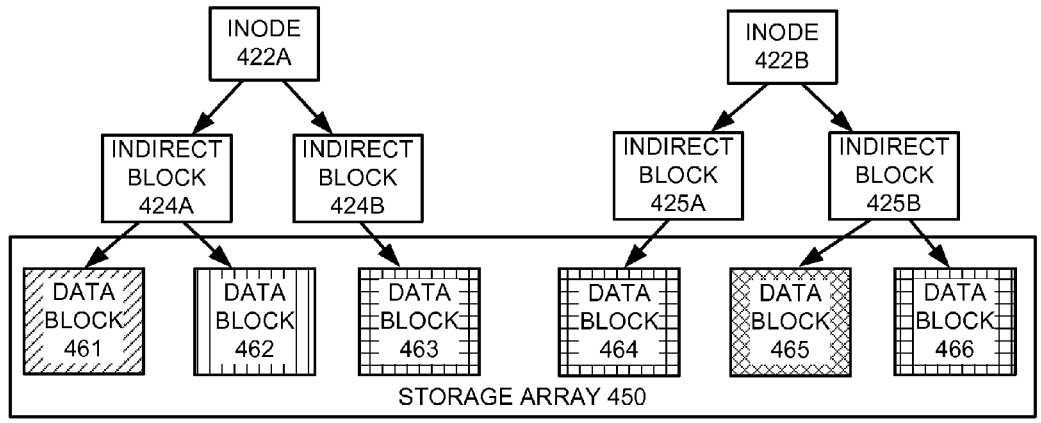
FIG. 4A illustrates a block diagram of a file system prior to performing a deduplication operation.
Figure 4B:
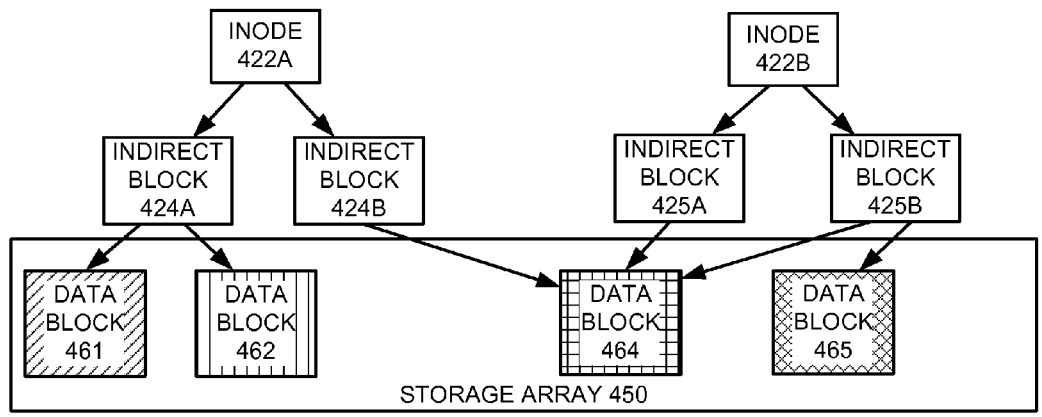
FIG. 4B illustrates a block diagram of a file system after performing a post-processing deduplication operation.

FIGS. 4A and 4B illustrate one example of how a deduplication operation may be performed. FIG. 4A illustrates a block diagram of a file system prior to performing a deduplication process. The file system contains two buffer tree structures associated with two files. A file system will typically include many more files and buffer tree structures. Only two are shown for purposes of illustration. Inode 422A and 422B, among other functions, point to the indirect blocks associated with the respective files. The indirect blocks point to the physical blocks of data in storage array 450 which make up the respective files. For example, inode 422A is made up of the blocks labeled data block 461, data block 462, and data block 463. A typical file will be made up of many more blocks, but the number of blocks is limited for purposes of illustration. The fill patterns of the data blocks illustrated in FIG. 4A are indicative of the content of the data blocks. As indicated by the fill patterns, the blocks labeled data block 463, data block 464, and data block 466 contain identical data. Because these blocks contain identical data, performing deduplication can make additional storage space available in the storage system.

FIG. 4B illustrates a block diagram of the file system of FIG. 4A after post-processing deduplication has been performed. The result of the process is that data block 463 and data block 466 are no longer used. Indirect blocks 424B, 425A, and 425B each now point to one instance of the data block, data block 464. Data block 464 is now used by both inode 422A and 422B. Data block 463 and 466 are no longer used and the associated storage space is now available for other purposes. It should be understood that data associated with data block 463 and 466 which are physically stored on the media may not actually be removed or deleted as part of this process. In some systems, references to the data locations are removed or changed thereby logically releasing those storage locations from use within the system. Even though released, the data which made up those blocks may be present in the physical storage locations until overwritten at some later point in time when that portion of the physical storage space is used to store other data. The term "deleted" is used herein to indicate that a block of data is no longer referenced or used and does not necessarily indicate that the data associated with the block are deleted from or overwritten in the physical storage media at the time.

In some cases, the block(s) which are deleted from the buffer tree through the deduplication process are referred to as recipient blocks. In the examples of FIGS. 4A and 4B, data block 463 is a recipient block. In some cases, the data block which remains and is pointed to by the metadata associated is referred to as the donor block. In the examples of FIGS. 4A and 4B, data block 464 is the donor block.

In some cases, deduplication is performed by generating a unique fingerprint for each data block. The fingerprint may be generated by applying a hash function, such as SHA-256 or SHA-512, to the data block. Two or more identical data blocks will always have the same fingerprint. By comparing the fingerprints during the deduplication process, duplicate data blocks can be identified and coalesced as illustrated in FIGS. 4A and 4B. Depending on the fingerprint process used, two matching fingerprints may, alone, be sufficient to indicate that the associated blocks are identical. In other cases, matching fingerprints may not be conclusive and a further comparison of the blocks may be required. Because the fingerprint of a block is much smaller than the data block itself, fingerprints for a large number of data blocks can be stored without consuming a significant portion of the storage capacity in the system. The fingerprint generation process may be performed as data blocks are received or may be performed through post-processing after the blocks have already been stored. The transition from FIG. 4A to FIG. 4B illustrates deduplication performed on data objects that are already stored in storage array 450 (i.e., post-processing deduplication).

Figure 4C:
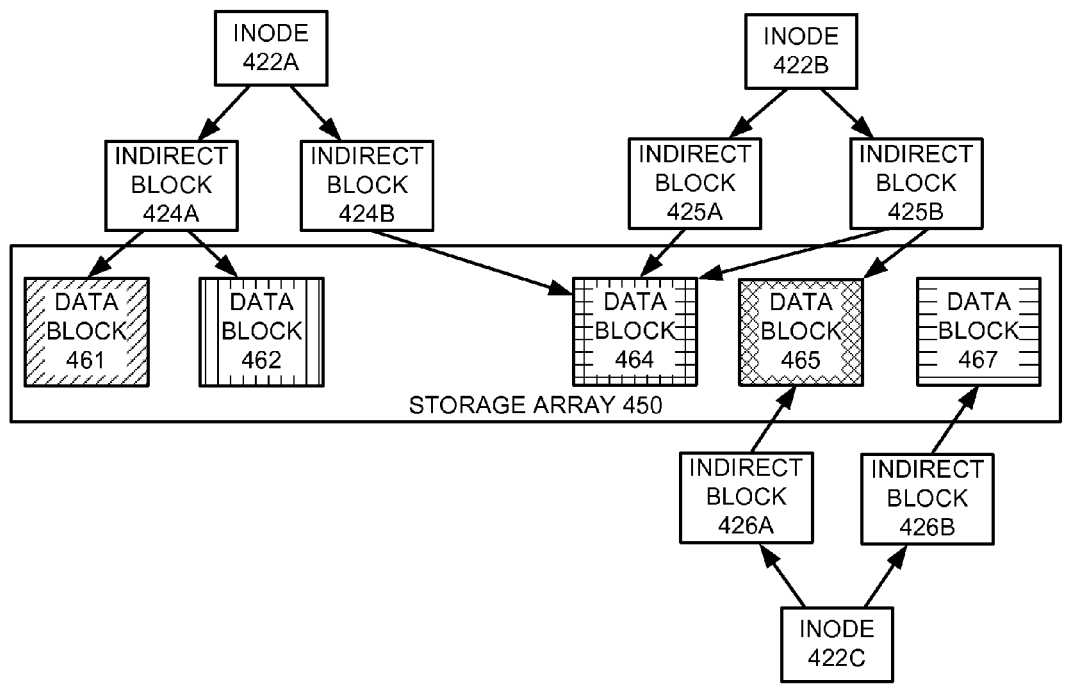
FIG. 4C illustrates a block diagram of a file system after performing an inline deduplication operation.

FIG. 4C illustrates the file system after inline deduplication has been performed on a newly received data object. The new data object contains data block 467 and a data block that is the same as data block 465. The new data object is stored in memory of the storage system and inline deduplicated before the data blocks are stored in storage array 450. Fingerprints are generated for the data blocks of the new data object and the deduplication is performed by comparing the fingerprints to fingerprints of blocks already existing in storage array 450. Inode 422C is created for the new data object.

One of the data blocks of the new data object is found to be identical to data block 465. Therefore, this data block does not get separately stored in storage array 450, and indirect block 426A is configured to point to the existing instance of data block 465. Data block 467 is not found to exist in storage array 450, so it is stored in storage array 450. A duplicate instance of data block 465 is not created in storage array 450 and subsequently removed through post-processing deduplication. In contrast, data blocks 463 and 466 were first written to storage array 450 before being removed in the post-processing deduplication process illustrated in FIGS. 4A and 4B. The inline deduplication process illustrated in FIG. 4C must be performed on a real time, or near real time basis. Using the techniques provided herein, the inline deduplication process illustrated in FIG. 4C is only selectively performed on those new data objects that have statistical likelihoods of providing a deduplication benefit. Therefore, computing resources are not spent to perform inline deduplication on data objects that do not have a statistical likelihood of providing a deduplication benefit. However, the latter data objects may still be deduplicated in a post-processing deduplication operation as illustrated in FIGS. 4A and 4B.

Figure 5:
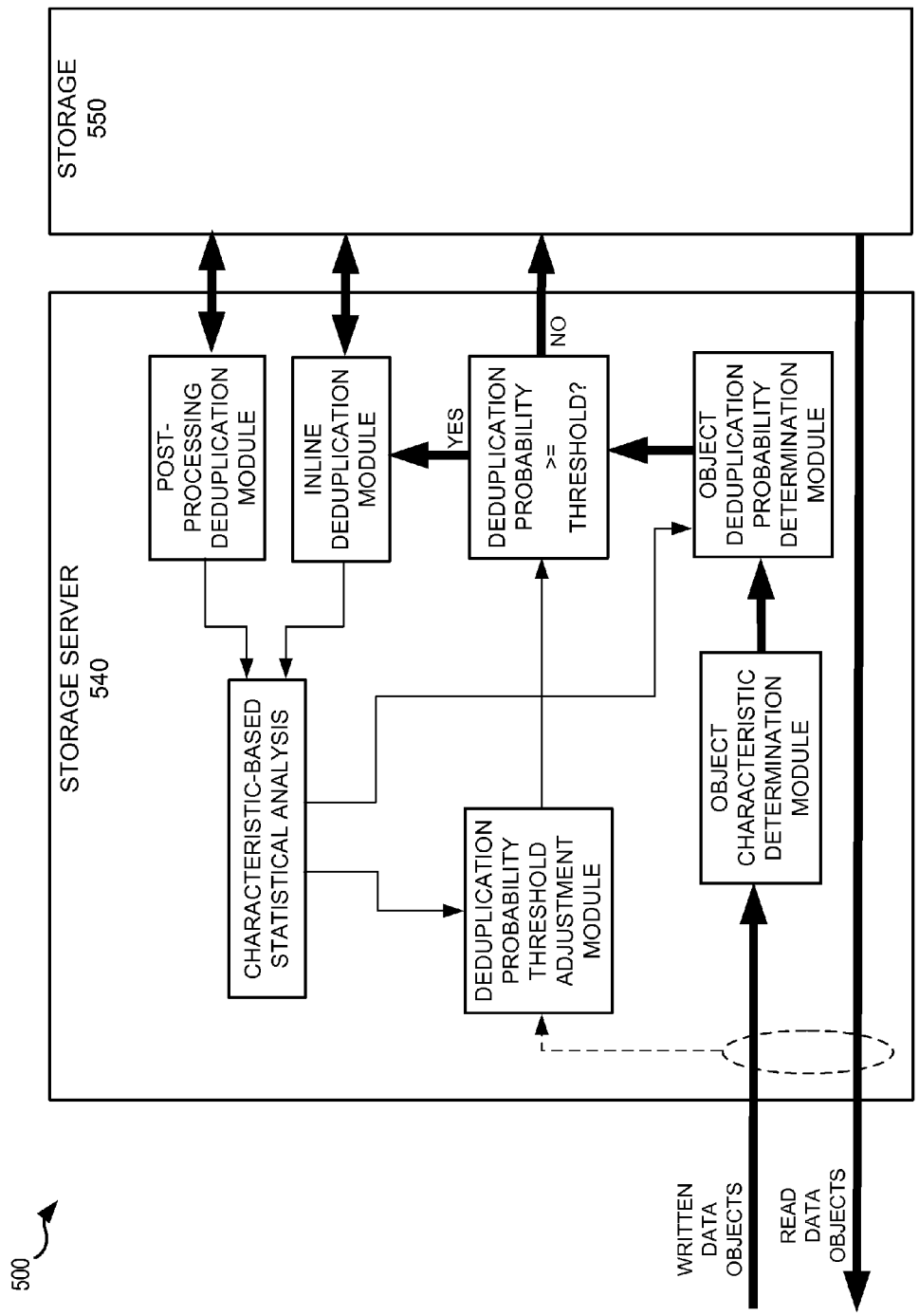
FIG. 5 illustrates a data storage system for performing selective inline deduplication.

FIG. 5 illustrates data storage system 500 for performing selective inline deduplication in accordance with the techniques introduced here. Data storage system 500 includes storage server 540 and storage 550. As noted above, however, the techniques do not necessarily have to be implemented in a server. Storage server 540 is a processing device that includes a storage operating system that implements one or more file systems and can be operated in an environment such as shown in FIG. 1. Storage server 540 can be a server-class computer that provides storage services relating to the organization of information on storage 550 and/or other storage devices. Storage server contains various modules for performing the functions described here. Storage 550 is any type of writable, persistent storage media and may include multiple storage devices of various types including hard disk drives, solid state storage devices, and storage controllers.

Storage server 540 receives data objects from clients that are to be written to storage 550. Storage server 540 also responds to requests from clients to read data objects from storage 550. Storage server 540 has the capability to perform both inline deduplication and post-processing deduplication. Inline deduplication is performed on data objects while they are still in memory of storage server 540 and before they have been stored in storage 550. Post-processing deduplication is performed on data objects that have already been stored in storage 550 in non-deduplicated form. Inline deduplication may be performed on received data objects with respect to data in storage 550 that has been previously deduplicated and/or with respect to data in storage 550 that has not been deduplicated.

Storage server 540, or another device, monitors deduplication operations performed on data objects in storage 550 to gather characteristic-based statistics about which types of data objects provided a deduplication benefit and which did not. The statistics contain information about how frequently data objects with various types of characteristics were able to provide a deduplication benefit in previous deduplication operations. In some cases, this data may be gathered only from post-processing deduplication operations. In other cases, this data may also be gathered from inline deduplication operations. The characteristic-based statistics may include historical deduplication results that can be parsed based on many different types of data object characteristics including sizes of data objects, types of data objects, owners of the data objects, last modified date of data objects, update frequencies of data objects, and/or other data object characteristics. For example, the statistics may indicate that more frequently updated data objects have a higher probability of being able to be deduplicated than data objects that are updated less frequently. In some cases, the characteristics of the data objects that are used to determine the deduplication probability for the data object may also be referred to as "factors."

If characteristic-based statistics are gathered only from post-processing deduplication activities, the statistics may not be evenly representative of all data objects being stored to the system because some of the data objects are being inline deduplicated and would not be included in the post-processing statistics. This situation may be addressed in at least two different ways as described below.

In a first approach, the characteristic-based statistics that are used to determine the deduplication probability threshold and the deduplication probabilities of individual objects are obtained from other information available in the storage system rather than directly from one of the deduplication processes. After deduplication is performed, metadata describing the block sharing relationships that were created is stored which allows the shared data blocks of a data object to be identified and located. Buffer trees of deduplicated data objects, such as those in FIG. 4B, can be scanned to obtain block sharing information. For example, the indirect blocks may be scanned to determine that indirect blocks 424B, 425A, and 425B all point to data block 464. This block sharing information, along with other information about the data objects, can be used to generate the characteristic-based statistics. Because this information is gathered across all deduplicated data objects of a volume, directory, or other grouping, it may include information pertaining to data objects that were deduplicated in both post-processing and inline deduplication processes.

A second approach to including both inline and post-processed deduplicated data objects in the statistics is to disable inline deduplication periodically to perform one or more post-processing deduplication operations that encompass all of the data objects written to the system over a period of time. The resulting statistics gathered from those deduplication operations will include information about data objects that may otherwise be inline deduplicated.

In one variation of the technique, the deduplication statistics may be gathered from or provided by another storage server or another data storage system. One benefit of using this information from other sources is that a larger sample size may provide better statistics. On the other hand, statistics based on data objects being stored in other systems may be less representative of the data objects being stored in the storage system in which the statistics will be used.

Ideally, storage server 540 would perform inline deduplication on all received data objects before they were stored in storage 550. This would reduce the amount of physical storage space needed in storage 550 and would eliminate the I/O intensive processes associated with performing post-processing deduplication. However, this is only possible if storage server 540 has sufficient computational resources that can be devoted to performing the inline deduplication on every data object while still satisfying desired performance metrics for storage server 540. These performance characteristics may include read throughput, write throughput, read response time, write response time, utilization of one or more networks associated with the data storage system, or a combination thereof.

After an initial deduplication probability threshold is determined for storage server 540, data objects having deduplication probabilities that meet or exceed the deduplication probability threshold will be inline deduplicated by storage server 540 before being stored in storage 550. In this way, the limited computational resources available from storage server 540 for performing inline deduplication can be used on those data objects that have better statistical probabilities of providing storage space benefit as a result of the deduplication. Statistically, this provides a greater overall deduplication benefit than performing inline deduplication on a randomly selected percentage of the data objects received by storage server 540. If inline deduplication is performed on a data object and no common blocks are identified, system resources have been used and the write process slowed with no corresponding benefit.

As each data object is received by storage server 540 for writing to storage 550, a deduplication probability for that data object is determined based on a characteristic of the data object and the previously discussed statistics. The determination may also be made based on additional characteristics of the data object. If multiple characteristics are considered, various statistical methods can be used to properly scale the contribution of each of those characteristics such that the resulting combined deduplication probability is normalized to a range of zero to one or a range of zero to one hundred percent. The resulting deduplication probability for a data object is not a definitive indication of whether there will be a deduplication benefit associated with that data object. It is a statistical indication of a likelihood that there will be a deduplication benefit associated with that data object.

The deduplication probabilities of data objects can be quantitatively related to characteristics of the data objects using a variety of known statistical methods such as frequency count, classification, Bayesian techniques, other mathematical techniques, or combinations thereof. The contributions of deduplication probabilities associated with various characteristics may also be weighted such that they have differing levels of contribution to the overall deduplication probability of the data object. For example, the update frequency of a data object may be somewhat indicative in determining a deduplication probability for a data object, but the size of the data object may still be a stronger indicator. In this case, the contribution of the object size to the deduplication probability may be given more weight than the update frequency.

If the deduplication probability for a data object satisfies the current deduplication probability threshold, inline deduplication is performed on the data object by storage server 540 before the data object is stored in storage 550. If the deduplication probability for the data object does not satisfy the current deduplication probability threshold, the data object is stored in storage 550 without having deduplication performed. Not performing inline deduplication on some of the received data objects preserves resources of storage server 540 to ensure that it can continue to meet performance requirements and continue to serve read and write requests in a timely manner.

Storage server 540 may also be configured to adjust the deduplication probability threshold. The deduplication probability threshold may be adjusted based on any one or more of various different factors, such as: performance of the storage server, the read/write request load, read/write response times, resource availability in storage server 540, or other operational characteristics of storage server 540, including combinations thereof. For example, the deduplication probably threshold may currently be set at 60%. Incoming data objects with deduplication probabilities of 60% or more, as determined based on characteristics of the data object, will be inline deduplicated. Based on how many data objects are being inline deduplicated and the availability of resources in storage server 540, storage server 540 may determine that the performance requirements of storage server 540 can still be met even if the deduplication probability threshold is lowered. In other words, based on recent performance, sufficient resources may be available to still meet the performance requirements even if the deduplication probability threshold is dropped from 60% to 50%. Once this adjustment is made, more data objects will be deduplicated inline because all received data objects having a deduplication probability of at least 50%, rather than the previous 60%, will now be inline deduplicated.

Similarly, the deduplication probability threshold may be increased. Increasing the threshold will tend to reduce the number of data objects that are inline deduplicated. The threshold may be increased because storage server 540 is not meeting a performance metric or requirement. The threshold may also be preemptively increased based on information indicating that the workload of storage server 540 will be increasing in the near future and/or that the availability of resources of storage server 540 will decrease. These types of adjustments to the deduplication probability threshold can be made repeatedly as the environment or circumstances change. In some cases, the adjustment may be made periodically. The various types of information discussed above that may be used in making determinations regarding adjustment of the deduplication probability threshold can be used to make these adjustments in a feedback loop configuration.

The deduplication probability threshold may also need to be adjusted to compensate for changes in the characteristics of data objects being written to the storage server. For example, storage server 540 may be meeting performance requirements while operating with a deduplication probability threshold of 45%. The characteristics of the data objects being written to storage server 540 may change such that a higher percentage of the data objects being written have a high deduplication probability. In other words, a larger number of the data objects being written begin satisfying the 45% deduplication probability threshold. This increase in the number of data objects being inline deduplicated may put storage server 540 at risk of missing a performance metric or requirement. In response, the deduplication probability threshold may be increased to reduce the number of data objects that will be inline deduplicated.

In another variation of the technique, data objects having higher deduplication probabilities may be given higher priority than data objects with lower deduplication probabilities, even though the data objects with lower deduplication probabilities satisfy the deduplication probability threshold. If storage server 540 has a number of data objects in memory that have not yet been deduplicated or stored in storage 540, an object with the highest deduplication probability may be chosen for inline deduplication over the others, even though it has been received more recently than the other data objects. In other words, storage server 540 may use a priority scheme based on relative deduplication probabilities rather than a first-in first-out (FIFO) process. In some cases, depending on available system resources, the data objects with the lower deduplication probabilities may be stored in storage 550 without being inline deduplicated even though they had deduplication probabilities which exceeded the current deduplication probability threshold.

In one example, the prioritized data object processing described above may be implemented using a multi-level deduplication probability process. Data objects may be assigned differing levels of priority for deduplication processing based on which of multiple levels of deduplication probability thresholds are satisfied. The multiple levels of deduplication probability threshold may have a hierarchical relationships to each other.

In some embodiments, the number of data objects being inline deduplicated in a specified time period may be monitored and the deduplication probability threshold may be adjusted to maintain a target rate of data object inline deduplication. In one variation, the rate may be measured based on a quantity of data being inline deduplicated rather than a number of data objects.

In some embodiments, a deduplication probability threshold may also be used to selectively perform post-processing deduplication using the techniques described above. As with inline deduplication, post-processing deduplication may be performed selectively in order to increase the benefits realized from the computing resources used to perform the deduplication. In this way, resources are not spent on the data objects which are least likely to provide a deduplication benefit. Selective post-processing deduplication may be performed in addition to the selective inline deduplication and using a different deduplication probability threshold than the corresponding inline process. Alternatively, the selective post-processing deduplication may be performed in place of the selective inline deduplication.

Embodiments of the disclosed technique include various steps and operations, which have been described above. A variety of these steps and operations may be performed by hardware components or may be embodied in machine-executable instructions, which may be used to cause one or more general-purpose or special-purpose processors programmed with the instructions to perform the steps. Alternatively, the steps may be performed by a combination of hardware, software, and/or firmware.

Embodiments of the techniques introduced here may be provided as a computer program product, which may include a machine-readable medium having stored thereon non-transitory instructions which may be used to program a computer or other electronic device to perform some or all of the operations described herein. The machine-readable medium may include, but is not limited to optical disks, compact disc read-only memories (CD-ROMs), magneto-optical disks, floppy disks, ROMs, random access memories (RAMs), erasable programmable read-only memories (EPROMs), electrically erasable programmable read-only memories (EEPROMs), magnetic or optical cards, flash memory, or other type of machine-readable medium suitable for storing electronic instructions. Moreover, embodiments of the disclosed solution may also be downloaded as a computer program product, wherein the program may be transferred from a remote computer to a requesting computer by way of data signals embodied in a carrier wave or other propagation medium via a communication link.

The phrases "in some embodiments," "according to some embodiments," "in the embodiments shown," "in other embodiments," "in some examples," and the like generally mean the particular feature, structure, or characteristic following the phrase is included in at least one embodiment of the disclosed solution, and may be included in more than one embodiment of the solution. In addition, such phrases do not necessarily refer to the same embodiments or different embodiments.

While detailed descriptions of one or more embodiments of the disclosed solution have been given above, various alternatives, modifications, and equivalents will be apparent to those skilled in the art without varying from the spirit of the solution. For example, while the embodiments described above refer to particular features, the scope of this solution also includes embodiments having different combinations of features and embodiments that do not include all of the described features. Accordingly, the scope of the solution is intended to embrace all such alternatives, modifications, and variations as fall within the scope of the claims, together with all equivalents thereof. Therefore, the above description should not be taken as limiting the scope of the disclosed solution, which is defined by the claims.

What is claimed is:

1. A method comprising:
   determining in a storage system a probability of deduplication for a data object, the probability of deduplication for the data object determined based on a characteristic of the data object, wherein the probability of deduplication for the data object is a statistical projection indicating a likelihood that the data object will provide a storage space benefit as a result of deduplication;
   determining in the storage system a deduplication probability threshold, the deduplication probability threshold determined based on a performance metric of the storage system and adjusted based on availability of resources of the storage system and recent performance of the storage system relative to the performance metric;
   determining in the storage system whether the probability of deduplication for the data object satisfies the deduplication probability threshold; and
   performing a deduplication operation on the data object in the storage system prior to the data object being stored in a persistent storage of the storage system in an event it is determined that the probability of deduplication for the data object satisfies the deduplication probability threshold.

2. The method of claim 1 wherein adjusting the deduplication probability threshold includes reducing the deduplication probability threshold in an event a performance projection for the storage system indicates that the storage system will continue to satisfy the performance metric using the reduced deduplication probability threshold.

3. The method of claim 2 wherein the performance projection is based on the recent performance of the storage system.

4. The method of claim 1 wherein determining the probability of deduplication for the data object based on the characteristic includes determining the probability of deduplication for the data object based on statistical information from prior deduplication operations on other data objects having the characteristic.

5. The method of claim 4 wherein the statistical information indicates a percentage of the other data objects having the characteristic that were deduplication candidates in the prior deduplication operations, wherein a deduplication candidate includes data blocks that are duplicates of other data blocks in the storage system.

6. The method of claim 5 wherein the prior deduplication operations include a plurality of post-processing deduplication operations performed on data objects already stored in the persistent storage of the storage system.

7. The method of claim 4 wherein determining the probability of deduplication for the data object further includes determining a second characteristic of the data object, and determining the probability of deduplication for the data object is further based on statistical information associated with the second characteristic.

8. The method of claim 1 wherein the performance metric is a service level objective (SLO).

9. The method of claim 1 wherein the performance metric includes a response time of the storage system, a throughput of the storage system, a utilization of one or more networks associated with the storage system, or a combination thereof.

10. The method of claim 1 wherein the characteristic is a size of the data object, a type of the data object, an owner of the data object, a last modified date of the data object, an update frequency of the data object, or a combination thereof.

11. The method of claim 1 further comprising performing a post-processing deduplication operation on the data object after the data object is stored in the persistent storage of the storage system in an event it is determined that the probability of deduplication for the data object does not satisfy the deduplication probability threshold.

12. The method of claim 1 wherein the storage system is operated in a Network Attached Storage (NAS) environment or in a Storage Area Network (SAN).

13. A data storage system comprising:
a processor; and
a memory coupled with the processor and including a storage manager that directs the processor to:
determine a deduplication probability threshold, the deduplication probability threshold determined based on a performance metric of the data storage system and adjusted based on availability of resources of the data storage system and recent performance of the data storage system relative to the performance metric;
determine, prior to a data object being stored in a persistent storage, a probability of deduplication for the data object, the probability of deduplication for the data object determined based on a characteristic of the data object, wherein the probability of deduplication for the data object is a statistical projection indicating a likelihood that the data object will provide a storage space benefit as a result of deduplication;
determine whether the probability of deduplication for the data object satisfies the deduplication probability threshold; and
perform a deduplication operation on the data object prior to the data object being stored in the persistent storage in an event it is determined that the probability of deduplication for the data object satisfies the deduplication probability threshold.

14. The data storage system of claim 13 wherein to adjust the deduplication probability threshold includes to reduce the deduplication probability threshold in an event a performance projection for the data storage system based on historical performance information indicates that the data storage system will continue to meet the performance metric using the reduced deduplication probability threshold.

15. The data storage system of claim 13 wherein to determine the probability of deduplication for the data object based on the characteristic includes to:
determine the probability of deduplication for the data object based on statistical information associated with the characteristic, the statistical information aggregated from prior deduplication operations.

16. The data storage system of claim 15 wherein the statistical information associated with the characteristic indicates a percentage of other data objects having the characteristic which were found to include data blocks that were duplicates of other data blocks during the prior deduplication operations.

17. The data storage system of claim 15 wherein:
to determine the probability of deduplication for the data object based on the characteristic further includes to determine a second characteristic of the data object; and
to determine the probability of deduplication for the data object is further based on statistical information associated with the second characteristic.

18. The data storage system of claim 13 wherein the performance metric is a service level objective (SLO).

19. The data storage system of claim 13 wherein the performance metric includes a response time of the data storage system, a throughput of the data storage system, a utilization of a network associated with the data storage system, or a combination thereof.

20. The data storage system of claim 13 wherein the characteristic is a size of the data object, a type of the data object, an owner of the data object, a last modified date of the data object, an update frequency of the data object, or a combination thereof.

21. The data storage system of claim 13 wherein the storage manager further directs the processor to perform a post-processing deduplication operation on the data object after it is stored in the persistent storage in an event it is determined that the probability of deduplication for the data object does not satisfy the deduplication probability threshold.

22. A method of performing selective deduplication comprising:
adaptively adjusting a deduplication probability threshold based on availability of resources in a data storage system and recent performance of the data storage system relative to a performance metric for the data storage system, the deduplication probability threshold determined based on the performance metric;
determining a probability of deduplication for a data object based on-a one or more characteristics of the data object, wherein the probability of deduplication for the data object is a statistical projection indicating a likelihood that the data object will provide a storage space benefit as a result of deduplication;
determining whether the probability of deduplication for the data object exceeds the deduplication probability threshold;
performing a deduplication operation on the data object prior to storing the data object in persistent storage of the data storage system in an event it is determined that the deduplication probability for the data object exceeds the deduplication probability threshold; and
performing the deduplication operation on the data object after storing the data object in the persistent storage in an event it is determined that the deduplication probability for the data object does not exceed the deduplication probability threshold.

23. The method of claim 22 wherein adjusting the deduplication probability threshold includes increasing the deduplication probability threshold in an event the data storage system is not meeting the performance metric.

24. The method of claim 22 wherein determining the probability of deduplication for the data object based on the one or more characteristics includes determining a percentage of other data objects having the one or more characteristics whose physical storage space requirements were reduced through prior deduplication operations.

25. The method of claim 22 wherein the performance metric includes a response time of the data storage system, a throughput of the data storage system, a utilization of one or more networks associated with the data storage system, or a combination thereof.

26. The method of claim 22 wherein the one ore more characteristics include a size of the data object, a type of the data object, an owner of the data object, a last modified date of the data object, an update frequency of the data object, or a combination thereof.

27. The method of claim 22 wherein the storage system is operated in a Network Attached Storage (NAS) environment or in a Storage Area Network (SAN).

* * * * *